United States Patent
Eckert et al.

(10) Patent No.: US 10,293,801 B2
(45) Date of Patent: May 21, 2019

(54) METHOD FOR THE ADAPTIVE CONTROL OF A DRIVER OPERATION-DEPENDENT ACTUAL VEHICLE DECELERATION

(71) Applicant: WABCO GmbH, Hannover (DE)

(72) Inventors: Horst Eckert, Rehburg-Loccum (DE); Florian Schwagmeyer, Heuerssen (DE)

(73) Assignee: WABCO GMBH, Hannover (DE)

( * ) Notice: Subject to any disclaimer, the term of this patent is extended or adjusted under 35 U.S.C. 154(b) by 205 days.

(21) Appl. No.: 15/384,337

(22) Filed: Dec. 20, 2016

(65) Prior Publication Data

US 2017/0174198 A1    Jun. 22, 2017

(30) Foreign Application Priority Data

Dec. 22, 2015   (DE) ........................ 10 2015 016 720

(51) Int. Cl.
    *B60T 13/74*    (2006.01)
    *B60T 13/68*    (2006.01)

(52) U.S. Cl.
    CPC ............ *B60T 13/74* (2013.01); *B60T 13/683* (2013.01); *B60T 2220/04* (2013.01); *B60T 2250/02* (2013.01)

(58) Field of Classification Search
    CPC ... B60T 7/06; B60T 8/172; B60T 8/18; B60T 8/1806; B60T 8/1887; B60T 2220/04
    See application file for complete search history.

(56) References Cited

U.S. PATENT DOCUMENTS

| | | | | |
|---|---|---|---|---|
| 5,409,301 A | * | 4/1995 | Topfer | ...................... B60T 7/20 303/22.1 |
| 5,496,097 A | * | 3/1996 | Eckert | ..................... B60T 13/66 303/155 |
| 6,256,571 B1 | * | 7/2001 | Fischer | ................... B60T 7/042 180/179 |
| 6,354,671 B1 | * | 3/2002 | Feldmann | ............... B60T 7/042 303/15 |
| 2011/0130935 A1 | * | 6/2011 | Krueger | .................. B60T 7/042 701/70 |

FOREIGN PATENT DOCUMENTS

EP    1000830 B1    5/2000

* cited by examiner

*Primary Examiner* — Anshul Sood
(74) *Attorney, Agent, or Firm* — Leydig, Voit & Mayer, Ltd.

(57) ABSTRACT

A method for the adaptive control of a driver operation-dependent actual vehicle deceleration in a commercial vehicle includes determining an operating variable that indicates a displacement of a brake pedal of a brake valve demanded by the driver as well as an assistance deceleration demand, providing a mass-dependent feeling curve that associates a driver's deceleration demand with the operating variable, adapting the mass-dependent feeling curve if there is no assistance deceleration demand so that the determined operating variable is associated with an actually prevailing actual vehicle deceleration, specifying a target vehicle deceleration depending on a driver operation-dependent driver's deceleration demand determined from the corresponding feeling curve and the assistance deceleration demand if there is an assistance deceleration demand, and actuating a brake pressure corresponding to the target vehicle deceleration for adaptively adjusted, driver operation-dependent control of the actual vehicle deceleration.

21 Claims, 6 Drawing Sheets

METHOD FOR THE ADAPTIVE CONTROL OF A DRIVER OPERATION-DEPENDENT ACTUAL VEHICLE DECELERATION

CROSS REFERENCE TO RELATED APPLICATIONS

This application claims benefit to German Patent Application No. DE 10 2015 016 720.0, filed Dec. 22, 2015, which is incorporated by reference herein.

FIELD

The invention concerns a method for the adaptive control of a driver operation-dependent actual vehicle deceleration in a brake system of a vehicle, in particular of a commercial vehicle, as well as an adaptation unit for performing the method.

BACKGROUND

Brake valves in brake systems of a vehicle, for example a commercial vehicle, comprise an electrical stage and a pneumatic stage in order to effect braking demanded by the driver by adjusting a corresponding brake pressure, in particular in operating brakes of a vehicle, in particular a commercial vehicle, and thereby to set an actual vehicle deceleration. To form the electrical stage, a sensor unit is disposed in the brake valve that determines an operating variable representing the driver's demand, for example an operating travel of a brake pedal, and depending thereon a brake pressure that is proportional to the brake pedal position is adjusted at the operating brakes by means of a suitable electronically actuated valve. In the event of a failure of the electrical stage, a fallback level can be formed by means of a mechanical actuation that also corresponds to the operating travel of the brake pedal.

One such brake valve with a braking value generator is described in EP 1000830 B1 and comprises an operating plunger that is deflected by the brake pedal against the force of two springs. The deflection is detected electrically by the sensor unit and analyzed. The electrical actuation of a brake pressure modulator then takes place, for example of a proportionality valve that adjusts a control pressure. With said control pressure an air quantity boosting relay valve is actuated, which ultimately produces the brake pressure corresponding to the driver's demand and may adjust the brake pressure while taking into account a load-dependent axle load distribution on the corresponding operating brakes. The conversion of the deflection, i.e. of the operating travel of the brake pedal, into the brake pressure or the control pressure for the relay valve is carried out by means of a previously determined feeling curve, which associates a brake/control pressure to be adjusted by the relay valve with the operating travel. The feeling curve is of a two-stage form in this case, whereby in a first stage a wear-free brake, for example a retarder, is actuated up to a minimum operating travel of the brake pedal and above the minimum operating travel an operating brake that is subject to wear is actuated with the corresponding brake pressure while possibly taking into account an axle load distribution.

SUMMARY

In an embodiment, the present invention provides a method for the adaptive control of a driver operation-dependent actual vehicle deceleration in a commercial vehicle. The method includes determining an operating variable that indicates a displacement of a brake pedal of a brake valve demanded by the driver as well as an assistance deceleration demand, providing a mass-dependent feeling curve that associates a driver's deceleration demand with the operating variable, adapting the mass-dependent feeling curve if there is no assistance deceleration demand so that the determined operating variable is associated with an actually prevailing actual vehicle deceleration and at least one scaling factor is determined that adapts the driver's deceleration demand which results from the mass-dependent feeling curve for the determined operating variable to the determined actual vehicle deceleration, wherein, for this purpose, an adaptation feeling curve is formed that results from the mass-dependent feeling curve adapted with the scaling factor so that the adaptation feeling curve associates an adapted driver's deceleration demand with the operating variable, specifying a target vehicle deceleration depending on a driver operation-dependent driver's deceleration demand determined from the corresponding feeling curve and the assistance deceleration demand if there is an assistance deceleration demand, and actuating a brake pressure corresponding to the target vehicle deceleration for adaptively adjusted, driver operation-dependent control of the actual vehicle deceleration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

As described herein, a driver operation-dependent braking demand can be reliably and safely matched to the variables influencing a braking process.

As described herein, recourse can be had to a feeling curve adapted to the current braking behavior of the vehicle in the event of a combined braking demand of a driver's deceleration demand and a driver-assistance-demand. If, therefore, in the event of a braking demand from a driver assistance system, operation of a brake pedal of a brake valve by a driver takes place at the same time, first an operating variable characterizing the operation is directly tapped at the brake pedal or at an element that is connected to the brake pedal, for example a plunger. Using the corresponding feeling curve, a driver's deceleration demand is directly associated with the operating variable and is combined with the assistance deceleration demand, for example in an addition process. The operating variable can, for example, be an operating travel or an angle of rotation of the brake pedal during the operation by the driver.

This already has the advantage that in the case of driver braking specified by the brake pedal, the adjusted brake pressure or control pressure for the relay valves that are connected downstream, which is influenced in particular by the temperature-dependent spring characteristics of the spring provided in the brake valve, for example a spring made of an elastomer, for example a rubber spring or a steel spring, is not used to effect combined braking, but a demanded acceleration, i.e. the driver's deceleration demand that results from the corresponding feeling curve, is determined directly from the displacement of the brake pedal.

Therefore, a rubber spring comprises a strong temperature dependency in particular as well as being dependent on an operating rate during depression of the brake pedal by the driver. Depending on external influences, different brake pressures are thus adjusted for the same operating travel of the brake pedal, because the brake valve sets a brake pressure depending on a force exerted on the brake pedal, which is directly influenced by the spring characteristics of the spring. As a result, the determination of the driver's deceleration demand from the brake pressure or control pressure for use for relay valves that are connected downstream during combined braking is also inaccurate. As described herein, this problem can be avoided by the determination of the driver's deceleration demand.

Advantageously, an adaptation feeling curve is adapted as a corresponding feeling curve to the actually prevailing braking behavior, to which the driver has adapted during driver braking in a dedicated control loop. In the event of the operation of the brake pedal, therefore for purely driver braking, i.e. without a braking demand from a driver assistance system, in an effectively-stationary braking phase containing an approximately constant driver's deceleration demand, for the currently prevailing operating variables both a current actual vehicle deceleration is determined, for example, by means of an acceleration sensor, and also by means of a currently applicable feeling curve, which can either be a starting feeling curve, a preliminary feeling curve or an already present adaptation feeling curve, for example during current continuous driver braking, and a driver's deceleration demand associated with the operating variable is determined. If the driver's deceleration demand deviates from the actual vehicle deceleration, the respective feeling curve is accordingly scaled by the deviation and is used further as an adaptation feeling curve.

At the start of driver braking, the adaptation advantageously starts from a previously determined mass-dependent starting feeling curve or preliminary feeling curve, both of which represent vehicle-typical feeling curves that are adapted to the design and for which a certain mass of the vehicle is assumed. If there is not yet an adaptation feeling curve in the case of a combined braking demand because no isolated driver braking has yet been carried out, recourse is also made to the starting feeling curve or the preliminary feeling curve in order to also enable reliable combined braking even in this case.

Thus, on the one hand it can be achieved that for combined braking the specification of a driver's deceleration demand can be determined directly from the displacement of the brake pedal, and on the other hand an adaptation feeling curve is determined that already takes into account external influences as actually perceived by the driver, so that said external influences do not have a negative effect on the braking behavior. Therefore, it can for example be avoided that, with different temperatures and/or higher loadings, a different braking effect is set up that the driver has not wanted during constant brake operation for example.

In the adaptation feeling curve an association is stored that reproduces how the driver himself has adapted to the reaction of the vehicle in his operation of the brake pedal, whereby said adaptation already takes into account all external influences, because said external influences have a direct effect on the actual vehicle deceleration, which the driver also perceives. The braking behavior can thereby be configured to be safer and more reliable overall, because the dependency on properties of the components of the brake system, such as for example of the brake valve, can be canceled out or minimized.

The external influences on the braking behavior are thus automatically taken into account during the determination of the adaptation feeling curve and can be accordingly called up again during combined braking, so that a reliable adjustment of a brake pressure or of a control pressure can be carried out during combined braking. External influences can mean for example a vehicle mass, the temperature behavior of a rubber spring of the brake valve, the temperature behavior of a wheel brake, a defective wheel brake, limitation of the brake pressure for axles or for wheels for example in where electronic control is present in the context of ALB (Automatic Load-dependent Braking force control), EBL (braking force limiting), EBD (braking force distribution) or ABS functionality and an attached trailer vehicle, all of which can also be perceived by the driver during his operation and to which the driver can respond during braking with a corresponding change in the operation of the brake pedal in order to adjust the actual vehicle deceleration of the vehicle correspondingly.

The mass of the vehicle results in this case for a vehicle combination from the total mass, i.e. the mass of the towing vehicle as well as of a trailer vehicle that may be present. In the case of a vehicle without a trailer vehicle, the vehicle mass is only the mass of the vehicle.

In order to improve the accuracy of the adaptation feeling curve, a segmental adaptation is preferably carried out, i.e. the respective feeling curve is divided into segments and each segment is scaled with a corresponding (local) scaling factor that results from the actual vehicle deceleration during the operation of the brake pedal with an operating variable in the respective segment. Alternatively, a (global) scaling factor can also be used, which adjusts the entire respective feeling curve with a scaling factor that is for example averaged from all previously determined scaling factors.

Preferably, during the determination of the driver's deceleration demand only the influence of friction braking is taken into account, i.e. the influence of a possibly present and operated continuously operating brake in the vehicle is deducted by determining a continuously operating brake torque accordingly and subtracting the effect thereof on the actual vehicle deceleration from the determined actual vehicle deceleration while taking into account the vehicle mass as an offset deceleration. An engine braking torque that affects the actual vehicle deceleration can also be subtracted as an offset deceleration.

Preferably, adaptation only takes place during a brake application process, which occurs if the brake pressure rises against time or remains constant during braking following an increase, in order to advantageously prevent hysteresis effects that occur if the direction of motion of mechanical components that are involved, for example springs or sealing elements, changes because of the system or the design.

If the magnitude of the hysteresis effects is known or is small, this can be taken into account during the determination of the adaptation feeling curve, so that an adaptation can take place even during a brake releasing process.

Furthermore, it is provided that if the adaptation feeling curve exceeds a previously determined limit feeling curve, the adaptation feeling curve is fixed on the limit feeling curve. As a result, it can advantageously be achieved that during braking with a brake valve, in particular with a spring made of an elastomer, for example a rubber spring, and at a low temperature, for example a temperature below 0° C., whereby the spring characteristics of the rubber spring are influenced towards a reduction of the force-dependent spring travel, or a steel spring, the adaptation feeling curve has a very steep profile as a function of the operating travel and is thereby very inaccurate, whereby the determination of the driver's deceleration demand is also inaccurate. By fixing the adaptation feeling curve, at least an approximately accurate determination of the driver's deceleration demand can take place, and it can be arranged that the driver can specify his desired change of the driver's deceleration demand inaccurately but unequivocally with respect to the direction of increasing or decreasing the driver's deceleration demand.

According to an alternative embodiment, the adaptation feeling curve can also be raised above the limit feeling curve by setting a curve as the adaptation feeling curve that runs flatter than the limit feeling curve, in particular in the region of soft operation of the brake pedal, in the event of recognized definite driver braking, i.e. the operation of the brake pedal of the brake valve by the driver at least with a small operating variable has been detected. The adaptation feeling curve can be specified with a lower gradient than the limit feeling curve in the region of a small operating variable compared to the limit feeling curve. For large operating variables, the adaptation feeling curve approaches or merges with the limit feeling curve. This enables the driver to make a driver's brake pedal operation-dependent braking demand both gradually and also with a definite directional specification, i.e. a smaller or larger braking demand, if only soft operation of the brake pedal is also possible at cold temperatures because of the hard rubber spring.

To set the adaptation feeling curve, in this case a boost factor can be used, using which the feeling curve is determined from the limit feeling curve, whereby the boost factor has the largest value for smaller operating variables and reduces to 1 with increasing operating travel, so that the adaptation feeling curve approaches the limit feeling curve for large operating travels. As a result, the gradient of the adaptation feeling curve is lower for small operating travels and a controlled driver's brake pedal operation-dependent braking demand can also take place even at low temperatures.

In an advantageous embodiment, raising the adaptation feeling curve above the limit feeling curve in the lower region of the operating travel can also be arranged depending on a temperature. The lower the determined temperature, the greater the raising of the feeling curve above the limit feeling curve can be, i.e. the boost factor can be selected depending on the temperature.

Figure 1A:
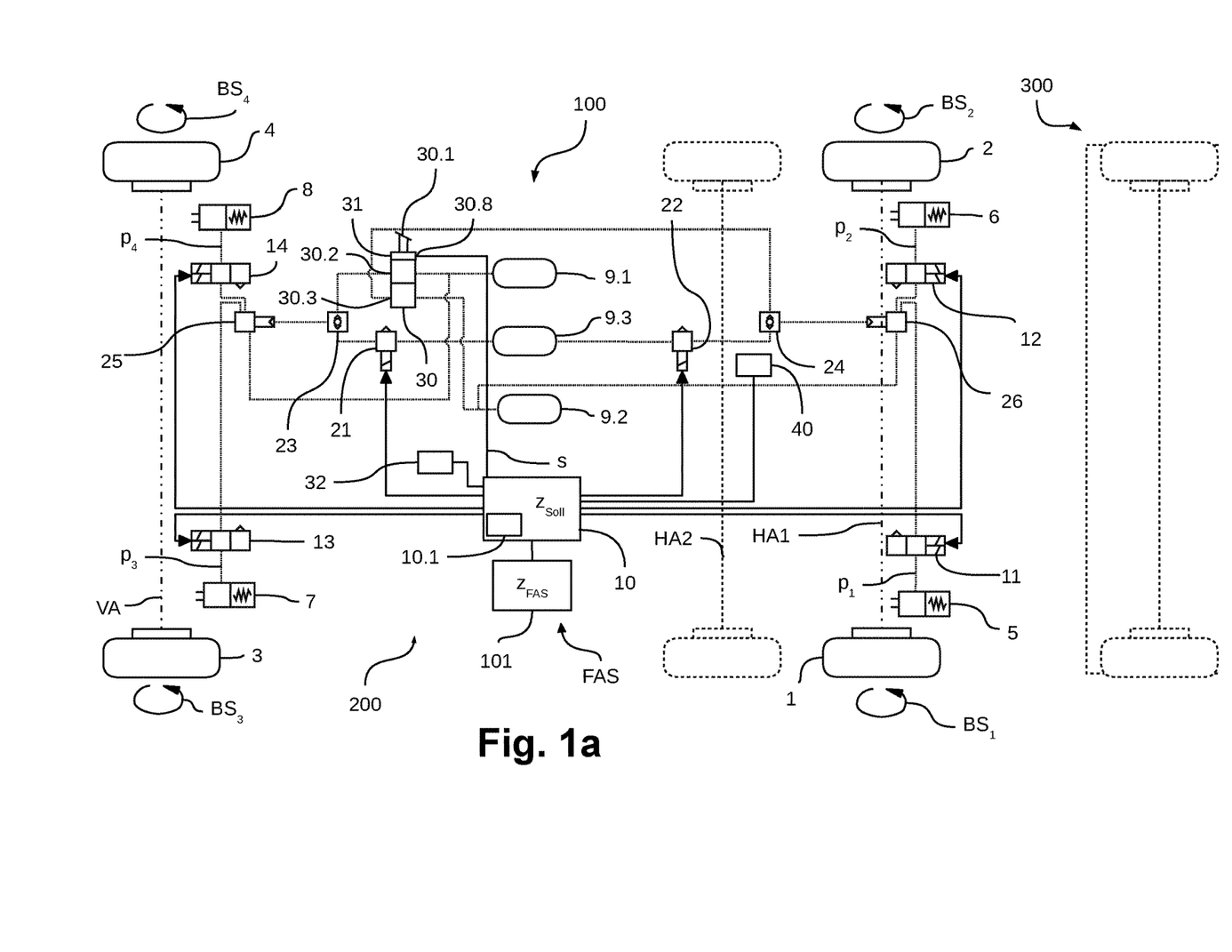
FIG. 1a shows a schematic view of a commercial vehicle according to an embodiment of the invention.

According to FIG. 1$a$, a vehicle 100 is provided with an electronically controlled brake system 200. According to this, a rear axle HA with rear wheels 1, 2 as well as a front axle VA with front wheels 3, 4 are provided. The rear wheels 1, 2 can be braked by means of rear wheel brakes 5, 6 and the front wheels 3, 4 by means of front wheel brakes 7, 8. The brake system 200 can be an electrohydraulic or electropneumatic brake system, i.e. a fluid pressure or an air pressure is controlled. Optionally, an additional trailer vehicle 300 can be provided.

For brake slip-controlled braking, the brake system 200 comprises an antilock braking system (ABS) with an ABS control device 10 that controls ABS brake valves 11, 12, 13, 14 in a pulsed manner depending on a detected brake slip $BS_1$, $BS_2$, $BS_3$, $BS_4$ on the respective wheels 1, 2, 3, 4. The brake slip $BS_1$, $BS_2$, $BS_3$, $BS_4$ can be determined on the individual wheels 1, 2, 3, 4 using revolution rate sensors that are not shown here and that measure a revolution rate of the respective wheels 1, 2, 3, 4.

The ABS-brake valves 11, 12, 13, 14 on the rear and front wheel brakes 5, 6, 7, 8 each comprise an inlet valve implemented as a 2/2-solenoid valve and an outlet valve. If the inlet valve is open and the outlet valve is closed, the corresponding wheel brakes 5, 6, 7, 8 can be subjected to brake pressure $p_1$, $p_2$, $p_3$, $p_4$ supplied from the pressure reservoir containers 9.1, 9.2 for the corresponding brake circuit, specified by a brake valve 30 and controlled by relay valves 25, 26, thereby causing corresponding braking by the wheels 1, 2, 3, 4. In particular, the brake pressure $p_1$, $p_2$, $p_3$, $p_4$ is controlled in this case depending on the operation of a brake pedal 30.1 of the brake valve 30, whereby for this purpose the brake valve 30 outputs a proportional front axle control pressure $p^S_{VA}$ or a rear axle control pressure $p^S_{HA}$ to the respective relay valve 25, 26 for operation of the brake pedal 30.1 and the relay valve then controls the corresponding brake pressure $p_1$, $p_2$, $p_3$, $p_4$ at the wheel brakes 5, 6, 7, 8.

Figure 1B:
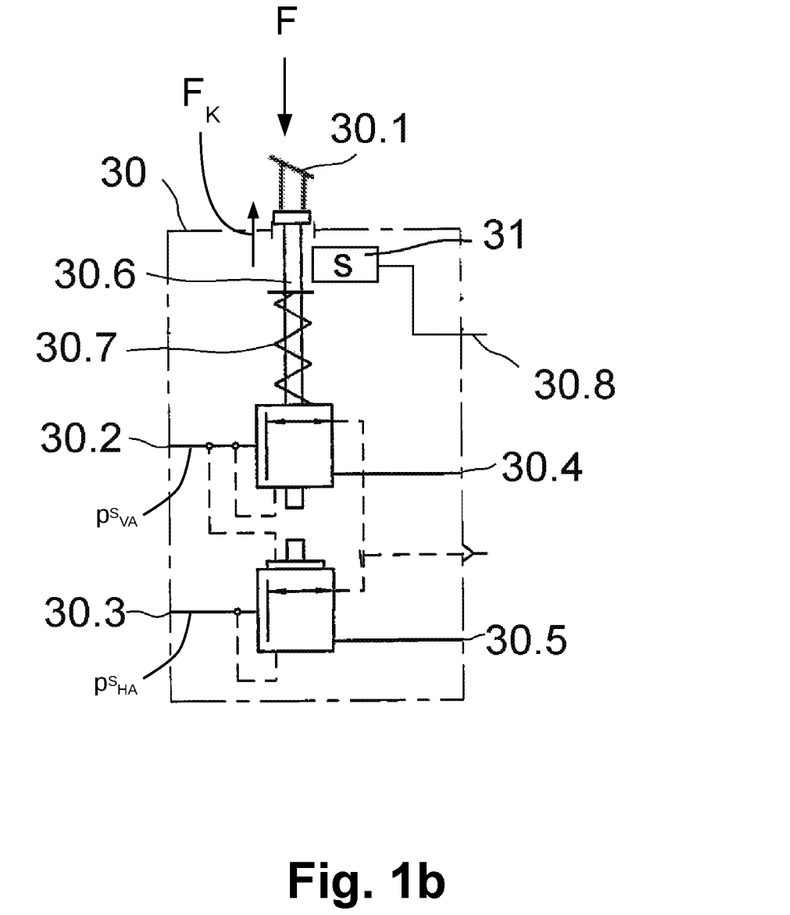
FIG. 1b shows a detailed view of a brake valve of the commercial vehicle according to FIG. 1.

One such brake valve 30 is schematically represented in FIG. 1$b$. By means of the brake valve outputs 30.2, 30.3, the brake valve 30 is connected to the corresponding relay valves 25, 26 of the respective brake circuit. The pressure reservoir containers 9.1, 9.2 provide a pressure by means of the brake valve inputs 30.4, 30.5. If the brake pedal 30.1 is operated with a force F, the displacement of the brake pedal 30.1 caused by the force F is transferred by means of a plunger 30.6 into the brake valve 30, whereby the plunger 30.6 operates against a spring force $F_K$ of a spring 30.7, preferably one or more rubber springs or steel springs. A sensor unit 31, for example a magnetic sensor unit, detects an operating travel s of the plunger 30.6 and outputs a corresponding signal by means of the electrical output 30.8 to the ABS control device 10. During an operation of the brake valve 30, the brake pressure $p_1$, $p_2$, $p_3$, $p_4$ is regulated depending on the force F exerted on the brake pedal 30.1, whereby the operating travel s of the plunger 30.6 caused by the force F exerted on the brake pedal 30.1, which is measured by the sensor unit 31, is dependent on the force F exerted on the brake pedal 30.1 and on the properties of the spring 30.7. A front axle control pressure $p^S_{VA}$ or a rear axle control pressure $p^S_{HA}$ corresponding to the operation of the brake pedal 30.1 is controlled at the brake valve outputs 30.2, 30.3 and a brake pressure $p_1$, $p_2$, $p_3$, $p_4$ that is proportional to the respective control pressure $p^S_{VA}$, $p^S_{HA}$ is adjusted by the respective relay valves 25, 26. The properties of the spring 30.7 mean here in particular the properties of a spring 30.7 that exert an influence on the resulting spring travel depending on the force F to be cushioned by the spring.

As a measure of the operation of the brake pedal 30.1, in particular an operating travel s is provided as an operating variable, whereby an angle of rotation ω of the brake pedal 30.1 can also be defined as an operating variable. In any case the respective operating variable s, ω directly represents the driver's braking intention, i.e. the intention to brake is tapped between the brake pedal 30.1 and the spring 30.7, i.e. before the spring 30.7 of the brake valve 30.

In the event of a control pressure $p^S_{VA}$, $p^S_{HA}$ suitably controlled by the brake valve 30 and a brake pressure $p_1$, $p_2$, $p_3$, $p_4$ supplied by the relay valves 25, 26 in the case in which the inlet valve of the corresponding ABS brake valve 11, 12, 13, 14 is shut off and the outlet valve is open, the rear and front wheel brakes 5, 6, 7, 8 are vented and the braking effects by the wheels 1, 2, 3, 4 are reduced, for example when the wheel 1, 2, 3, 4 involved is locked. If both the inlet valve and also the outlet valve are shut off, a brake pressure $p_1$, $p_2$, $p_3$, $p_4$ acting on the rear and the front wheel brakes 5, 6, 7, 8 is maintained.

The brake pressures $p_1$, $p_2$, $p_3$, $p_4$ that are actually applied to the wheel brakes 5, 6, 7, 8 can be set wheel-specifically by the ABS control device 10, so that a suitable response can be made if a target brake slip $BS_{Soll}$ is exceeded at one of the wheels 1, 2, 3, 4.

Furthermore, the ABS control device 10 is designed to set a demanded target vehicle deceleration $z_{Soll}$ by actuating the wheel brakes 5, 6, 7, 8 with the corresponding brake pressures $p_1$, $p_2$, $p_3$, $p_4$. A brake pressure $p_1$, $p_2$, $p_3$, $p_4$ for the wheel brakes 5, 6, 7, 8 can thereby also be specified by the ABS control device 10 besides the brake valve 30. This can be achieved by the ABS control device 10 first actuating a 3/2-way valve 21 for the wheel brakes 7, 8 of the front axle VA or a 3/2-way valve 22 for the wheel brakes 5, 6 of the rear axle HA, which are connected to a further pressure reservoir container 9.3. The 3/2-way valves 21, 22 are each connected by means of a non-return valve 23, 24 to a relay valve 25, 26 for the respective axle of the vehicle VA, HA. In the event of suitable actuation of the 3/2-way valves 21, 22, control pressure $p^S_{VA}$, $p^S_{HA}$ that may be provided by the brake valve 30 can be increased by enabling the connection between the pressure reservoir containers 9.1, 9.2 and the ABS brake valves 11, 12, 13, 14 by means of the relay valves 25, 26. A brake pressure $p_1$, $p_2$, $p_3$, $p_4$ can thereby also be increased at the front or rear wheel brakes 5, 6, 7, 8 by means of the ABS brake valves 11, 12, 13, 14 in order to the fulfill the demanded target vehicle deceleration $z_{Soll}$.

The target vehicle deceleration $z_{Soll}$ can in this case be composed of a driver operation-dependent driver's deceleration demand $z_F$ that is specified by the brake valve 30 and that results from the operating variable s, ω from the electrical output 30.8 of the brake valve 30, and an externally demanded assistance deceleration demand $z_{FAS}$, whereby in the case of $z_F=0$ or $z_{FAS}=0$ pure driver assistance system braking or pure driver braking can also take place, which is demanded by the ABS control device 10. I.e. a target vehicle deceleration $z_{Soll}$ is specified that can take account of both the driver's intention to brake and also the intention to brake of an external driver assistance system, for example a XBR (external brake request), RSC (rollover prevention), ACC (autonomous cruise control), AEBS (emergency braking system), etc.

The assistance deceleration demand $z_{FAS}$ is in this case given by an external control device 101 of the respective driver assistance system FAS for example. In order to be able to determine the driver's deceleration demand $z_F$ from the operation of the brake pedal 30.1, i.e. from the respective operating variable s, ω, an adaptation unit 10.1 according to an embodiment of the invention is provided in the ABS control device 10, in which a conversion of the corresponding operating variable s, ω into the driver's deceleration demand $z_F$ is carried out. For this purpose, in the adaptation unit 10.1 first a starting feeling curve $K_{Start}$ is stored that uniquely associates a driver's deceleration demand $z_F$ with the respective operating variable s, ω. Exemplary starting feeling curves $K_{Start}$ are represented in FIGS. 2a, 2b and 2c, each of which shows the dependency of the driver's deceleration demand $z_F$ on the operating travel s of the brake pedal 30.1 for different types of vehicle.

Figure 2A:
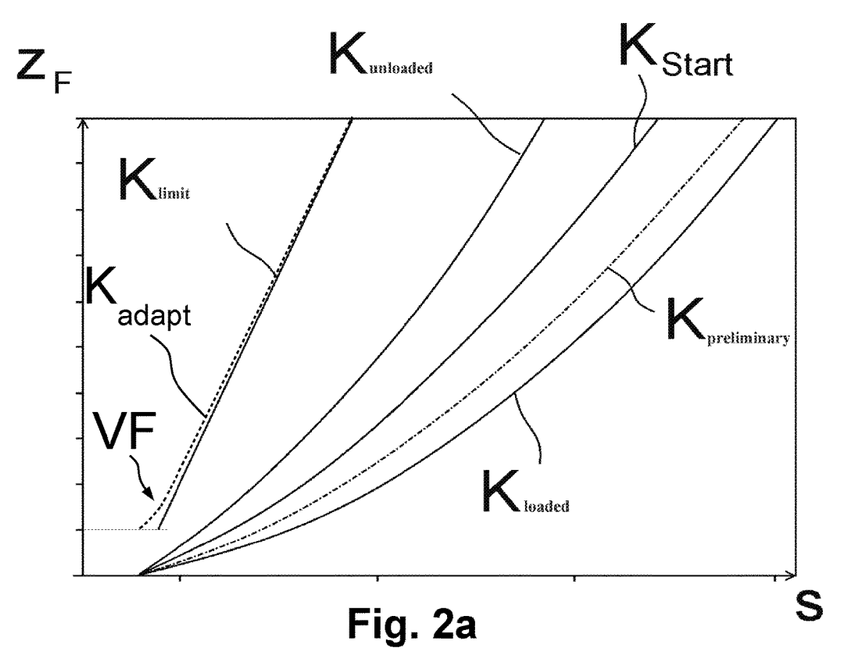
FIGS. 2a, b, c show example profiles of starting, mass, and preliminary feeling curves for different types of vehicle according to an embodiment of the invention.
Figure 2B:
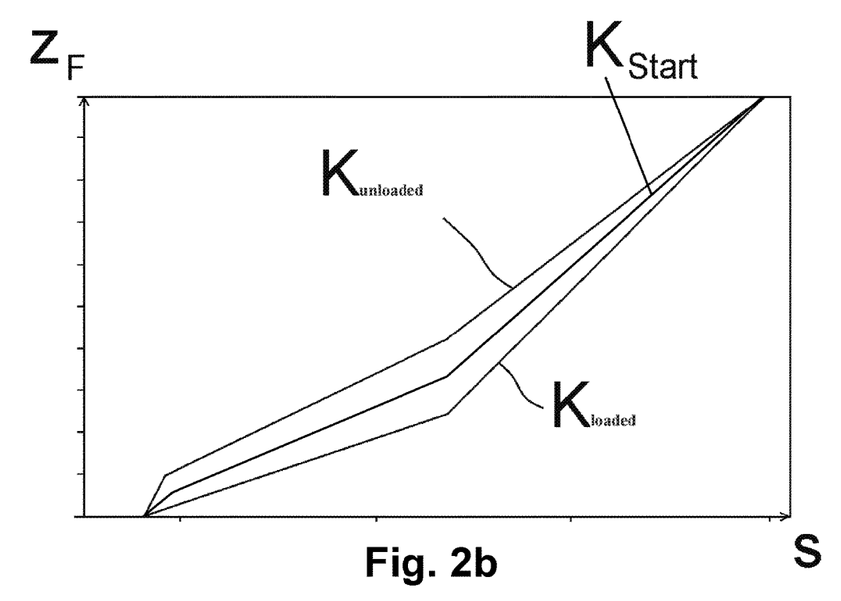
Figure 2C:
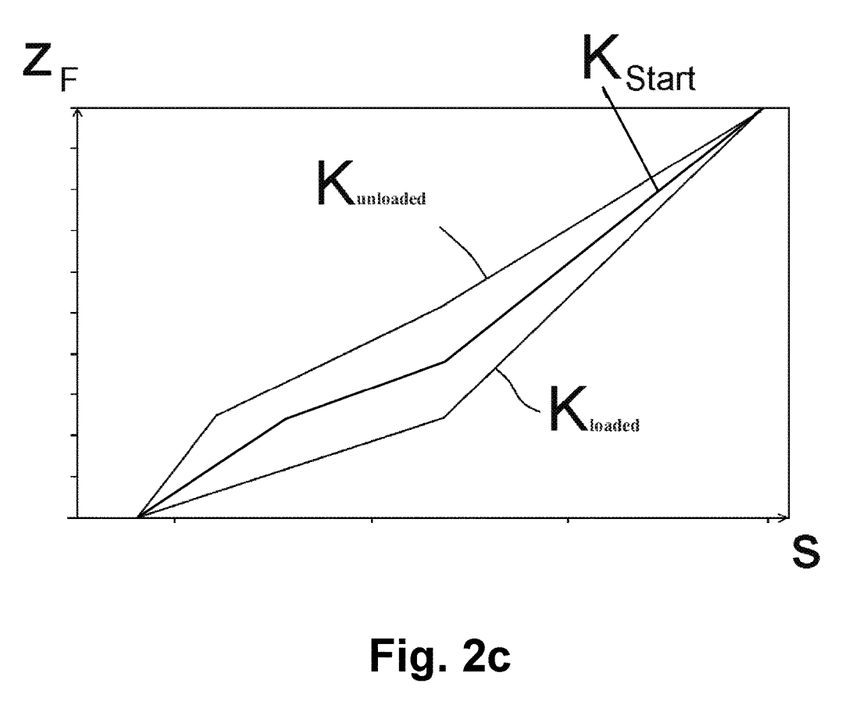

In the case of a combined braking demand directly after starting the vehicle 100, the target vehicle deceleration $z_{Soll}$ to be demanded by the ABS control device 10 thus results from the addition of the assistance deceleration demand $z_{FAS}$ specified by the external control device 101 and the driver's deceleration demand $z_F$ for example, which according to the examples in FIG. 2a, 2b or 2c results from the operating travel s of the brake pedal 30.1 operated by the driver directly from the respective starting feeling curve $K_{Start}$. I.e. the driver operates the brake pedal 30.1 in the event of an assistance deceleration demand $z_{FAS}$ and will thereby additionally decelerate the vehicle 100.

In this case the starting feeling curve $K_{Start}$ is initially used only as a starting point for an association directly after starting the vehicle 100, if for example no mass $M_{Fzg}$ could still be determined. The starting feeling curve $K_{Start}$ is determined in advance for an average vehicle 100 of the corresponding vehicle type and equipment configuration with a load of greater than or equal to 50%, for example 60%, in particular 70%, and is stored on the ABS control device 10. Therefore, if an external assistance deceleration demand $z_{FAS}$ combined with the operation of the brake pedal 30.1 by the driver already occurs after starting the vehicle 100, a fairly reliable driver's deceleration demand $z_F$ and thereby a target vehicle deceleration $z_{Soll}$ can already be determined from the starting feeling curve $K_{Start}$.

To set the starting feeling curves $K_{Start}$ represented in FIGS. 2a, 2b and 2c for different types of vehicle by way of example, the braking performance that results is estimated in relation to the specific implementation of the brake system for the type of vehicle involved, for example a type of vehicle that is fitted with electronic control in the context of ALB (automatic load dependent braking force control), EBL (braking force limiting), EBD (braking force distribution), ABS functionality and/or with an attached trailer vehicle 300 and/or with a certain axle load distribution and/or an average mass $M_{Fzg}$, and using said braking performance an association of the operating variable s, ω with the driver's deceleration demand $z_F$ is determined that is represented by the starting feeling curve $K_{Start}$.

According to FIG. 2a, a starting feeling curve $K_{Start}$ is determined that is provided for a vehicle 100 without ALB, EBL or EBD functionality or comparable functions for axle load-dependent adapted actuation of the ABS-brake valves 11, 12, 13, 14 and a spring element in the brake valve 30 that implements a feeling curve, which owing to the properties thereof regarding the dependency of the spring travel on the spring force $F_K$ implements a feeling curve with a harmonic profile, for example a spring made of an elastomer, for example a rubber spring or a steel spring shaped for this purpose. Therefore, the starting feeling curve $K_{Start}$ extends over the entire profile smoothly rising or harmonically without kinks or steps, because the single spring 30.7 disposed in the brake valve 30, which influences the operation of the brake pedal 30.1 by the driver, has a smooth force profile when using a spring made of an elastomer at temperatures of higher than approx. −20° C., resulting in a correspondingly smooth operating travel s profile because of the properties of the spring, and also otherwise no significant external influences play a role in the braking behavior. The starting feeling curve $K_{Start}$ shown in FIG. 2a thereby applies for example to a commercial vehicle designed according to US standards, which in particular is not designed according to the vehicle regulation ECE-R13 (ECE—Regulation No. 13).

In FIG. 2b and FIG. 2c, however, the starting feeling curve $K_{Start}$ comprises two kinks in each case, whereby the first kink results with increasing operating travel s from the fact that the EBL or the EBD function is pressure-limiting and thereby decelerates the vehicle and the second kink, which occurs at a larger operating travel s, in particular results from the fact that said starting feeling curves $K_{Start}$ are provided for a vehicle 100 with a brake valve 30 with two separate springs. The two springs influence the operating force-dependent operating travel s during operation of the brake valve 30 by acting with a force F for different operating travels s, whereby the first spring is always effective during operation of the brake valve 30 and the second spring acts in addition to the first spring during the operating travel s at which the second, upper kink occurs, whereby the springs can comprise different spring forces $F_K$. The two springs together cause a feeling curve corresponding to the profiles of the feeling curves represented in FIGS. 2b and 2c during operation of the brake valve 30. The springs influence the operating force-dependent operating travel s of the plunger 30.6 or of the brake pedal 30.1 caused by the driver such that at low operating forces F, i.e. in the lower target vehicle deceleration region, a larger operating travel s is to be applied, with which braking is graded better for the driver in the lower target vehicle deceleration region, and a smaller operating travel s is to be carried out by the driver at larger braking forces for the same increase in pressure. I.e. in the two target vehicle deceleration regions, the lower and upper regions, different gradients of operating travel-dependent target vehicle decelerations are set there during braking, which result from different effective spring forces $F_K$. The first operating travel-dependent stage for a short operating travel s results from the provided EBD, EBL and/or ALB functionality. The starting feeling curves $K_{Start}$ shown in FIGS. 2b and 2c thereby apply, in particular for a commercial vehicle that is not designed according to US standards, which means in particular that the commercial vehicle is designed according to vehicle regulation ECE-R13.

In order to achieve a conversion matching the actual braking behavior, the starting feeling curve $K_{Start}$ is adjusted or adapted in the adaptation unit 10.1 to the current driving and braking situation as follows:

In a preliminary adaptation, first a mass $M_{Fzg}$ is incorporated that, for a vehicle combination consisting of a towing vehicle 100 and one or more trailer vehicles 300, results from the total mass of both or more parts of the vehicle. For example, in this case the mass $M_{Fzg}$ can be provided by any weight measurement by means of the CAN bus or it can be determined by a control unit, for example the ABS control device 10 or the external control device 101, using further, for example CAN bus information, whether one or more trailer vehicles 300 are coupled while the vehicle 100 is travelling during transmission gear shifting. The adaptation is carried out in this case depending on a first mass feeling curve $K_{loaded}$ and a second mass feeling curve $K_{unloaded}$, each of which defines an association for a fully loaded vehicle 100 and an association for an unloaded vehicle 100 of the respective vehicle type. By way of example, such mass feeling curves $K_{loaded}$, $K_{unloaded}$ are represented in FIGS. 2a, 2b and 2c for the respective type of vehicle. If the vehicle 100 is fully loaded ($K_{loaded}$) or completely unloaded ($K_{unloaded}$), recourse is made directly to the corresponding mass feeling curve $K_{loaded}$, $K_{unloaded}$, i.e. there is a pre-adapted preliminary feeling curve $K_{preliminary}$ that corresponds to the respectively involved mass feeling curve $K_{loaded}$, $K_{unloaded}$ and that is used in the ABS control unit 10 after determining the mass $M_{Fzg}$ for an association of the operating variable s, ω with the driver's deceleration demand $z_F$ for combined braking.

If there is a vehicle-mass $M_{Fzg}$ that lies between the loaded and the unloaded states, the mass feeling curves $K_{loaded}$, $K_{unloaded}$ are to be scaled accordingly, i.e. for a 75% loaded vehicle 100 the preliminary feeling curve $K_{preliminary}$ is given for example by $0.75 \times K_{loaded}$, as indicated by way of example in FIG. 2a, and an association of the operating variable s, ω with the driver's deceleration demand $z_F$ is determined using the scaled dependency in the preliminary feeling curve $K_{preliminary}$.

Figure 3:
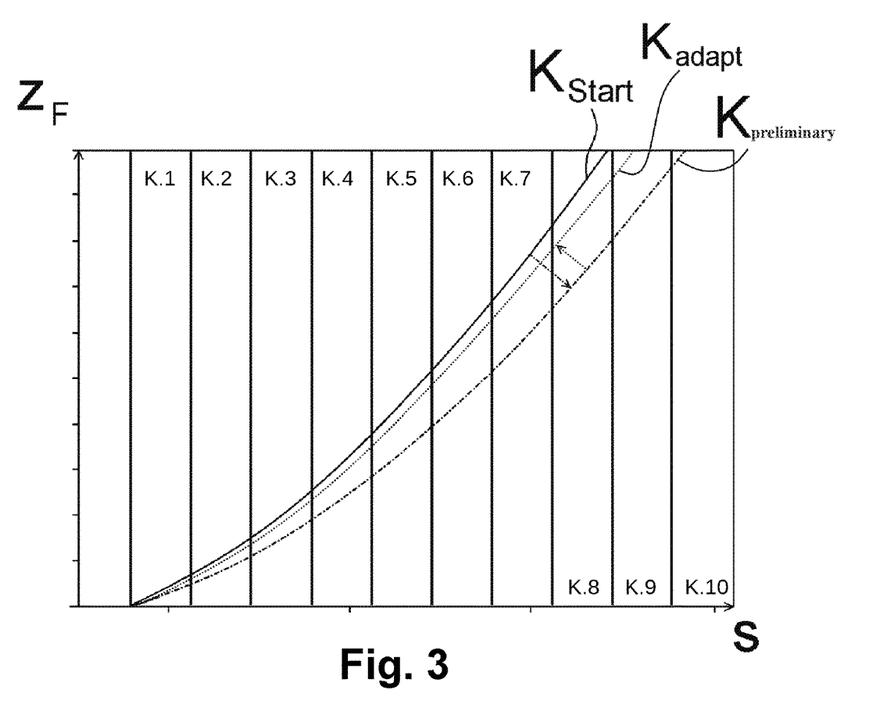
FIG. 3 shows an exemplary profile of an adaptation feeling curve according to an embodiment of the invention in a segmental view.

In a further adaptation step, once there is isolated driver braking without an external assistance deceleration demand $z_{FAS}$, i.e. $z_{FAS}=0$, the preliminary feeling curve $K_{preliminary}$ is adapted into an adaptation feeling curve $K_{adapt}$, which takes into account the actual braking behavior intended by the driver in the current braking situation, whereby the vehicle mass $M_{Fzg}$ is already taken into account indirectly in the braking behavior. FIG. 3 shows such an adaptation feeling curve $K_{adapt}$ for the type of vehicle according to FIG. 2a, whereby the process of adaptation is indicated with the dashed arrows. Therefore, the starting feeling curve $K_{Start}$ is used initially, and once the vehicle mass $M_{Fzg}$ is available a preliminary feeling curve $K_{preliminary}$ adapted thereto is formed in order to already obtain a more accurate association for combined braking before performing isolated driver braking. Then the preliminary feeling curve $K_{preliminary}$ is adapted to the adaptation feeling curve $K_{adapt}$. If there is still no vehicle-mass $M_{Fzg}$ available at the point in time of isolated driver braking, an adaptation takes place starting from the starting feeling curve $K_{Start}$ and an adaptation depending on the vehicle-mass $M_{Fzg}$ is omitted, because the vehicle mass $M_{Fzg}$ is already taken into account indirectly during the adaptation.

To set the adaptation feeling curve $K_{adapt}$, once there is purely driver braking with $z_{FAS}=0$ that is effectively stationary, i.e. there is an approximately constant driver's braking demand within a defined period of time dt of for example 1 s, in which the driver holds the brake pedal 30.1 depressed essentially constantly, at least one of the respective operating variables s, ω is detected and an actually prevailing actual vehicle deceleration $z_{1st}$ is determined. For this purpose, according to said exemplary embodiment the sensor unit 31 that is disposed on the brake valve 30 is used, which preferably measures the operating travel s of the plunger 30.6 caused by the operation of the brake pedal 30.1 and transmits said operating travel s to the ABS control device 10 by means of the electrical output 30.8. The actual vehicle deceleration $z_{1st}$ is for example detected by an acceleration sensor 32 (see FIG. 1a) in the vehicle 100 or by a control unit, for example the ABS-control unit 10, from measurement signals of the revolution rate sensors, which are not represented in FIG. 1a, on the individual wheels 1, 2, 3, 4.

The pair of values obtained thereby of respective operating variable s, ω and measured actual vehicle deceleration $z_{1st}$ are then compared with the values of the preliminary feeling curve $K_{preliminary}$ or the starting feeling curve $K_{Start}$—depending on which curve is being considered, i.e. whether the mass $M_{Fzg}$ is known or not—and are adapted accordingly. For this purpose, it is first determined with which value of the driver's deceleration demand $z_F$ the measured operating variable s, ω is associated by the preliminary feeling curve $K_{preliminary}$ or the starting feeling curve $K_{Start}$. If said value deviates from the actually measured actual vehicle deceleration $z_{1st}$, then the preliminary feeling curve $K_{preliminary}$ or the starting feeling curve $K_{Start}$ is adapted with a scaling factor S, whereby the scaling factor S is given by $S=z_{1st}/z_F$, so that for the adaptation feeling curve $K_{adapt}$ the following applies: $K_{adapt}=S \times K_{preliminary}$ or $K_{adapt}=S \times K_{Start}$. According to the example in FIG. 3, starting from the mass-dependent preliminary feeling curve $K_{preliminary}$, an upward adaptation takes place with a scaling factor of S>1, i.e. the driver actually specifies a higher driver's deceleration demand $z_F$ by his operation of the brake pedal 30.1 than would actually result from the preliminary feeling curve $K_{preliminary}$.

Said scaling can for example result from the fact that the spring 30.7 has different spring characteristics $F_K$ because of a lower temperature T than that assumed for the type of vehicle in the feeling curves $K_{Start}$, $K_{loaded}$, $K_{unloaded}$, and thereby, owing to a higher force F exerted by the driver on the brake pedal 30.1 for the same operating travel s, a higher control pressure $p^S_{VA}$, $p^S_{HA}$ or brake pressure $p_1$, $p_2$, $p_3$, $p_4$ is set than was assumed for the type of vehicle. Thus, there is a hard spring 30.7 for low temperatures of for example minus 20° C., so that when operating the brake pedal 30.1 the driver must depress the brake pedal by a shorter operating travel s in order to cause the same actual vehicle deceleration $z_{1st}$ than for high temperatures of for example 30° C., because a higher force F is to be applied for the same operating travel s and thereby the adjusted control pressure $p^S_{VA}$, $p^S_{HA}$ or brake pressure $p_1$, $p_2$, $p_3$, $p_4$ is higher.

The same applies for a larger vehicle mass $M_{Fzg}$, for example for greater loading of the vehicle 100, in which case the driver perceives that the vehicle 100 responds with a lower actual vehicle deceleration $z_{1st}$ for a certain operating travel s. Accordingly, the driver adjusts his braking habits by depressing the brake pedal 30.1 further and harder before changing to effectively-stationary braking.

I.e. the driver assigns an operating variable by specifying the respective operating variable s, ω, here the operating travel s, for a value of the actually prevailing actual vehicle deceleration $z_{1st}$, whereby any currently prevailing influences—such as the vehicle mass $M_{Fzg}$, the temperature of the wheel brakes, the temperature T of the brake valve 30 with the spring 30.7, a failed wheel brake, ABL control, etc.—are taken into account because said influences have a direct effect on the actually measured actual vehicle deceleration $z_{1st}$. Preferably, said adaptation only takes place during a brake application process because of hysteresis phenomena between brake application processes and brake releasing processes, caused in particular by the mechanical components of the wheel brakes and operating devices thereof. If wheel brakes, including the operating devices thereof, with which a small braking hysteresis can be achieved are used, adaptation can take place additionally or alternatively during a brake releasing process. The hysteresis component may also be deducted during the adaptation by for example adapting the operating travel s accordingly in the case of known hysteresis properties.

In order to achieve a differentiated adaptation of the adaptation feeling curve $K_{adapt}$, according to FIG. 3 a segmental adaptation of the preliminary feeling curve $K_{preliminary}$ or the starting feeling curve $K_{Start}$ can advantageously take place, i.e. the preliminary feeling curve $K_{preliminary}$ or the starting feeling curve $K_{Start}$ is divided into for example ten segments K.i; i=1, . . . , 10 of equal sizes, which cover the entire possible operating travel s of the plunger 30.6. In an alternative embodiment, the segments K.i in the entire region of the operating travel s are of different sizes, advantageously such that the segments K.i in the lower region of the operating travel s are smaller than in the upper region. In FIG. 3 segments K.i of equal size are selected.

If now during a first measurement during isolated driver braking an operating variable s, ω is determined that lies in a third segment K.3 of the preliminary feeling curve $K_{preliminary}$ or the starting feeling curve $K_{Start}$, first a global scaling factor S is determined that is given by $S=z_{1st}/z_F$. First the full preliminary feeling curve $K_{preliminary}$ or the starting feeling curve $K_{Start}$ is multiplied by said global scaling factor S, so that a corresponding adaptation feeling curve $K_{adapt}$ results. If in a further subsequent measurement during isolated driver braking an operating variable s, ω is now determined that lies in a different segment K.i than the third segment K.3, for example measured in the fourth segment K.4, then a segmental adaptation is carried out such that for the segment K.i involved a local scaling factor S.i is determined that only applies to the segment K.i involved as well as the subsequent segments for which no scaling factor S.i has yet been determined.

I.e. in the above-mentioned example the third segment K.3 is scaled with the third scaling factor S.3 that is determined from the first measurement—now local—and the fourth segment K.4 is scaled with the fourth scaling factor S.4 determined from the subsequent measurement, likewise given by $S.4=z_{1st}/z_F$ with the measured actual vehicle deceleration $z_{1st}$ and the driver's deceleration demand $z_F$ from the fourth segment K.4. All following segments K.i with i=5, . . . , 10 are also scaled with the fourth scaling factor S.4 as long as no dedicated local scaling factor S.i has been determined for the following segments K.i with i=5, . . . , 10, because no driver braking with an operating variable s, ω has yet been carried out in said segments K.i with i=5, . . . , 10.

Alternatively, for the segments K.i, for which no dedicated local scaling factor S.i has yet been determined, because there is as yet no driver braking with an operating variable s, ω in said segments K.i with i=5, . . . , 10, an averaged scaling factor $S_{av}$ from all previously determined scaling factors S.3, S.4 can be used. This also applies to the segments K.1, K.2 lying before the third segment K.3 and for which likewise no scaling factor S.1, S.2 has yet been determined. However, the adjacent third scaling factor S.3 can also be selected for the first two segments K.1, K.2.

A differentiated adaptation of the corresponding feeling curve $K_{preliminary}$, $K_{Start}$ thereby takes place, which represents the actually prevailing braking behavior in the corresponding segment K.i, which can sometimes vary depending on temperature or load in the different segments K.i. Thus, depending on the actual braking behavior of the driver during braking, an adaptation feeling curve $K_{adapt}$ can be determined. The adaptation of the adaptation feeling curve $K_{adapt}$ always takes place in this case if exclusively driver braking is occurring and the same can be analyzed for an adaptation, which means that the driver braking has a stationary braking phase. The adaptation feeling curve $K_{adapt}$ is used by the ABS control device 10 once a target vehicle deceleration $z_{Soll}$ is determined in the presence of a combined braking demand of a driver's deceleration demand $z_F$ and an assistance deceleration demand $z_{FAS}$.

In FIG. 2a, in addition a limit feeling curve $K_{limit}$ is provided that results from the fact that for a brake valve 30 with for example a rubber spring as the spring 30.7, at temperatures T below 0° C. the spring characteristic thereof changes such that it is increasingly harder with falling temperature T, which results in increasingly smaller operating travel s being applied by the driver of the vehicle 100 during driver braking with operation of the brake pedal 30.1, and thereby also of the plunger 30.6, in order to set a determined control pressure $p^S_{VA}$, $p^S_{HA}$ through the brake valve 30. I.e. an adaptation feeling curve $K_{adapt}$, which takes said influence into account, varies increasingly steeply in the diagram of FIG. 2a with decreasing temperature T in order to be so steep at temperatures T of minus 20° C. and lower that the operating travel s for the adjustment of a certain high pressure in order to achieve a certain high braking effect is so small owing to the hard spring 30.7 that there is effectively purely force control for setting a control pressure $p^S_{VA}$, $p^S_{HA}$ by the driver. Because of the steep rise, the adaptation feeling curve is inaccurate, so that reliable determination of the driver's deceleration demand $z_F$ is also inaccurate.

If the limit feeling curve $K_{limit}$ is exceeded by the adaptation feeling curve $K_{adapt}$, i.e. once an actual vehicle deceleration $z_{1st}$ that lies above the limit feeling curve $K_{limit}$ is associated with an operating variable s, according to one embodiment the limit feeling curve $K_{limit}$ is used as an adaptation feeling curve $K_{adapt}$ until braking occurs again that is associated with an actual vehicle deceleration $z_{1st}$ that lies below the limit feeling curve $K_{limit}$.

According to an alternative embodiment, after the limit feeling curve $K_{limit}$ is exceeded for the first time, at least in the lower region (see FIG. 2a), i.e. for small operating travels s, the adaptation feeling curve $K_{adapt}$ is defined above the limit feeling curve $K_{limit}$ so that the adaptation feeling curve $K_{adapt}$ starts to rise in the event of a reliably detected operation of the brake pedal 30.1 of the brake valve 30 by the driver with a smaller operating travel s compared to the limit feeling curve $K_{limit}$, so that in the further profile depending on the operating travel s a smaller gradient than the limit feeling curve $k_{limit}$ results with increasing operating travel s.

For this purpose, for example a boost factor VF can be applied, with which, once the limit feeling curve $K_{limit}$ has been exceeded, the limit feeling curve $K_{limit}$ is scaled in order to obtain the adaptation feeling curve $K_{adapt}$, whereby the boost factor VF for small operating travels s is greater than for large operating travels s, so that for small operating travels s, which are decisive for a hard rubber spring, a flatter gradient of the adaptation feeling curve $K_{adapt}$ results than for large operating travels s. In particular, the boost factor VF for small operating travels s is greater than 1 and approaches VF=1 for large operating travels s, so that the adaptation feeling curve $K_{adapt}$ merges with the limit feeling curve $K_{limit}$, as shown in FIG. 2a in an exaggerated manner.

In an advantageous exemplary embodiment, during pure driver braking with $z_{FAS}=0$ during the determination of the adaptation feeling curve $K_{adapt}$ or the calculation of the scaling factors S; S.i, it is taken into account whether there is already a non-zero offset deceleration $z_{Off}$ at the start of braking, i.e. whether for pure driver braking with $z_{FAS}=0$ other factors have already resulted in a deceleration (negative acceleration) or acceleration (negative deceleration) of the vehicle 100 at the start of braking, for example an engine braking torque $M_S$, a road upslope FS or a road downslope FG, rolling resistances RW of the wheels 1, 2, 3, 4, air resistances LW, etc. External influences, i.e. influences that were not caused directly by the wheel brakes 5, 6, 7, 8 themselves, and that cause a non-zero change of the actual vehicle deceleration $z_{1st}$, as a rule >0, are thereby taken into account as an offset deceleration $z_{Off}$. The offset deceleration $z_{Off}$ can be continuously determined with updating, for example for a braking situation without driver braking and without driver assistance braking, i.e. for $z_F=0$ and $z_{FAS}=0$, or can be controlled and thereby made effective for braking in a braking situation with driver braking and without driver assistance braking, i.e. for $z_F>0$ and $z_{FAS}=0$, directly at the start of braking at a point in time at which there is already a first driver's deceleration demand $z_F$, but no brake pressures $p_1$, $p_2$, $p_3$, $p_4$ depending thereon, whereby at said point in time the prevailing actual vehicle deceleration $z_{1st}$ is determined as an offset deceleration $z_{Off}$. In addition, the offset deceleration $z_{Off}$ determined at the start of braking can also be continuously updated during pure driver braking by continuously updating the corresponding parameters, such as road gradient (upslope or downslope), rolling resistances, engine braking torque, etc., for example with further use of the speed of the vehicle and/or the engine revolution rate.

The adaptation of the adaptation feeling curve $K_{adapt}$ is then based on a corrected actual vehicle deceleration $z^{korr}_{1st}=z_{1st}-z_{Off}$ in order to take into account only the braking effect demanded by the driver.

Furthermore, a correction of the actual vehicle deceleration $z_{1st}$ in relation to the influence of a continuously operating brake 40 (see FIG. 1a) in the vehicle 100 can be taken into account. If for example during pure driver braking the intention to brake of the driver is converted into an actual vehicle deceleration $z_{1st}$ both by the wheel brakes 5, 6, 7, 8 and also by the continuously operating brake 40 by applying a continuous braking torque $M_{DB}$, the braking effect caused by the continuously operating brake torque $M_{DB}$ is deducted in the ABS control device 10, whereby in particular the vehicle mass $M_{Fzg}$ is incorporated for this. The continuously operating brake torque $M_{DB}$ can be transmitted to the ABS control device 10, for example by means of the CAN bus. The corrected actual vehicle deceleration $z^{korr}_{1st}$, which is based on the adaptation or the determination of the scaling factors S; S.i, is then given by $z^{korr}_{1st}=z_{1st}-z_{Off}-z_{DB}(M_{DB}, M_{Fzg})$, whereby $z_{DB}$ denotes a continuous braking deceleration resulting from the continuous braking torque $M_{DB}$.

Alternatively, if the continuously operating brake torque $M_{DB}$ is not known, a determination of the adaptation feeling curve $K_{adapt}$ takes place without subtracting the braking effect of the continuously operating brake 40.

Figure 4:
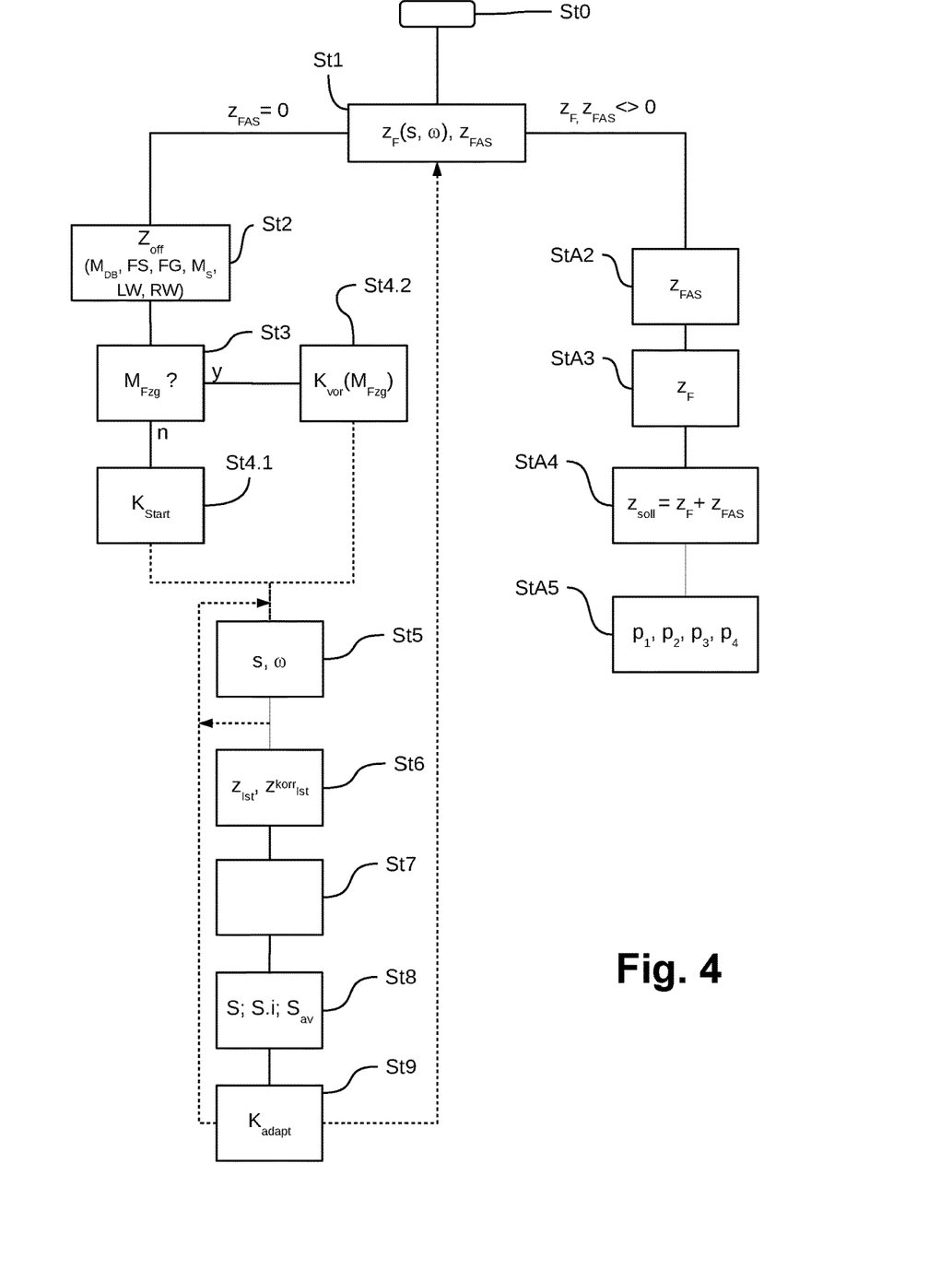
FIG. 4 shows a flow chart for a process of a method according to an embodiment of the invention.

A method according to an embodiment of the invention can proceed as follows for example, as FIG. 4 shows. In an initial step St0 the method is started, for example with initialization of the brake system 200 following the operation of the ignition by the driver. In a first step St1, a check is made as to whether there is a driver's deceleration demand $z_F$ in the form of the operation of the brake pedal 30.1 by an operating variable s, ω and/or an assistance deceleration demand $z_{FAS}$. If there is a pure driver's deceleration demand $z_F$, i.e. $z_{FAS}=0$, in a second step St2 an offset deceleration $z_{Off}$ is first determined if there are still no acting braking forces that are dependent on operation of the brake valve by the driver.

In a third step St3 it is determined whether a vehicle mass $M_{Fzg}$ is available, for example by means of the CAN bus. If the vehicle mass $M_{Fzg}$ is not yet known at this point in time, in a step St4.1 a vehicle-typical starting feeling curve $K_{Start}$ is read in for the subsequent adaptation that characterizes the braking behavior of the present type of vehicle, in particular in respect of braking performance for a loading of for example 50%. If the vehicle mass $M_{Fzg}$ is known, however, in a step St4.2 depending on mass feeling curves $K_{loaded}$, $K_{unloaded}$ a preliminary feeling curve $K_{preliminary}$ is determined that characterizes the braking behavior of the present type of vehicle, in particular in respect of braking performance for the actual loading. For this purpose, the mass feeling curves $K_{loaded}$, $K_{unloaded}$ are scaled accordingly depending on the vehicle mass $M_{Fzg}$ and are stored as the preliminary feeling curve $K_{preliminary}$.

In a fifth step St5, an operating variable s, ω is determined by the sensor unit 31 of the brake valve 30, which indicates how far or how firmly the driver has operated the brake pedal 30.1, and thereby for example the plunger 30.6 of the brake valve 30, and furthermore determines whether there is an effectively-stationary phase of a driver-braking demand during the braking, i.e. whether there is a phase in which the driver specifies an approximately constant driver's deceleration demand $z_F$ during at least one determined period of time dt of for example 1 s. If this is not the case, step St5 is performed again until there is effectively stationary braking and only then is the process continued with step St6.

In a sixth step St6, the actual vehicle deceleration $z_{est}$ is determined using the measurement signals of the acceleration sensor 32 and/or the measurement signals of the revolution rate sensors on the individual wheels 1, 2, 3, 4 and the corrected actual vehicle deceleration $z^{korr}_{1st}$ while incorporating the offset deceleration $z_{Off}$ that is determined in step St2.

In a seventh step St7, depending on whether step St4.1 or step St4.2 applies, the pair of values for operating variable s, ω and the actual vehicle deceleration $z_{1st}$, or if a correction by the offset deceleration $z_{Off}$ has taken place, the corrected actual vehicle deceleration $z^{korr}_{1st}$, is compared with the driver's deceleration demand $z_F$ associated with the measured operating variable s, ω by means of the starting feeling curve $K_{Start}$ or the preliminary feeling curve $K_{preliminary}$. If it is determined that the magnitudes of the decelerations differ from each other during the comparison, then in an eighth step St8 a local or global scaling factor S; S.i is determined that is given by $z_{1st}/z_F$ or $z^{korr}_{1st}/z_F$. If the two magnitudes of the decelerations agree during the comparison of the magnitudes of the decelerations in step St7, the method starts from the beginning, because no adaptation is necessary.

In a ninth step St9, the starting feeling curve $K_{Start}$ or the preliminary feeling curve $K_{preliminary}$ is adapted with the scaling factor S; S.i, so that an adaptation feeling curve $K_{adapt}$ is formed that is adapted to the actual braking behavior. For a more differentiated adaptation, a segmental adaptation is carried out with a respective scaling factor S.i for each segment K.i. If the isolated driver braking with $z_{FAS}=0$ ends after the ninth step St9, the method starts from the beginning at step St1. If the isolated driver braking is continued or carries on, the method reverts to the fifth step St5 and the adaptation is continued, possibly with altered influences and a changed operating variable s, ω, once an effectively-stationary braking phase could again be recognized. The already determined adaptation feeling curve $K_{adapt}$ is hereby preferably directly used as the starting point for an adaptation, i.e. the mass-dependent feeling curves $K_{Start}$, $K_{preliminary}$ are not resorted to in this case.

If in the step St1, there is combined braking with a driver's deceleration demand $z_F$ and an assistance deceleration demand $z_{FAS}$, in an alternative step StA2 the assistance deceleration demand $z_{FAS}$ is read in and in a step StA3 the driver's deceleration demand $z_F$ is determined from the starting feeling curve $K_{Start}$, the preliminary feeling curve $K_{preliminary}$ or the adaptation feeling curve $K_{adapt}$ by associating a driver's deceleration demand $z_F$ with the currently prevailing operating variable s, ω by means of the respective applicable feeling curve $K_{Start}$, $K_{preliminary}$, $K_{adapt}$. If an adaptation feeling curve $K_{adapt}$ has already been determined from the steps St2 through St9 for the current journey, said adaptation feeling curve $K_{adapt}$ is used. Otherwise, the starting feeling curve $K_{Start}$ or the preliminary feeling curve $K_{preliminary}$ is used, depending on whether a vehicle mass $M_{Fzg}$ is known.

In a step StA4, a target vehicle deceleration $z_{Soll}$ is then determined in the ABS control device 10 by means of an addition process, i.e. $z_{Soll}=z_F+z_{FAS}$, depending on which the ABS control valves 11, 12, 13, 14 as well as the 3/2-way valves 21, 22 are actuated in the step StA5 in order to set up the corresponding brake pressure $p_1$, $p_2$, $p_3$, $p_4$. Alternatively, a maximum can also be formed, with which a target vehicle deceleration $z_{Soll}$ is determined by the larger of the two demands, i.e. $z_{Soll}=z_F$ or $z_{Soll}=z_{FAS}$, depending on which demand is larger.

REFERENCE CHARACTER LIST (PART OF THE DESCRIPTION)

1, 2, 3, 4 wheels of the vehicle
5, 6, 7, 8 wheel brakes
9.1, 9.2, 9.3 pressure reservoir container
10 ABS control device
10.1 adaptation unit
11, 12, 13, 14 ABS brake valves
21, 22 3/2-way valve
23, 24 non-return valve
25, 26 relay valve
30 brake valve
30.1 brake pedal
30.2, 30.3 brake valve outputs
30.4, 30.5 brake valve inputs
30.6 plunger
30.7 spring
30.8 electrical output
31 sensor unit
32 acceleration sensor
40 continuously operating brake
100 vehicle
101 external control device
200 brake system
300 trailer vehicle
$BS_1$, $BS_2$, $BS_3$, $BS_4$ brake slip
$BS_{Soll}$ target brake slip
dt time period
F operating force
$F_K$ spring force
FAS driver assistance system
FS road upslope
FG road downslope
HA rear axle
K.i segment (i=1 through 10)
$K_{adapt}$ adaptation feeling curve
$K_{loaded}$ first mass feeling curve
$K_{limit}$ limit feeling curve
$K_{Start}$ starting feeling curve
$K_{unloaded}$ second mass feeling curve
$K_{preliminary}$ preliminary feeling curve
LW air resistance
$M_{Fzg}$ vehicle mass
$M_{DB}$ continuously operating brake torque
$M_S$ engine braking torque
$p_1$, $p_2$, $p_3$, $p_4$ brake pressure
$p^S_{VA}$, $p^S_{HA}$ control pressure
RW rolling resistance
s operating travel
S global scaling factor
S.i local scaling factor (i=1 through 10)
$S_{av}$ averaged scaling factor T temperature
VA front axle
VF boost factor
ω operating angle
$z_F$ driver's deceleration demand
$z_{FAS}$ assistance deceleration demand
$z_{1st}$ actual vehicle deceleration
$z^{korr}_{1st}$ corrected actual vehicle deceleration
$z_{Off}$ offset deceleration
$z_{Soll}$ target vehicle deceleration

The invention claimed is:

1. A method for the adaptive control of a driver operation-dependent actual vehicle deceleration ($Z_{Ist}$) in a commercial vehicle, the method comprising:
   determining an operating variable that indicates a displacement of a brake pedal of a brake valve demanded by the driver as well as an assistance deceleration demand;
   providing a mass-dependent feeling curve that associates a driver's deceleration demand with the operating variable;
   adapting the mass-dependent feeling curve if there is no assistance deceleration demand so that the determined operating variable is associated with an actually prevailing actual vehicle deceleration and at least one scaling factor is determined that adapts the driver's deceleration demand which results from the mass-dependent feeling curve for the determined operating variable to the determined actual vehicle deceleration, wherein, for this purpose, an adaptation feeling curve is formed that results from the mass-dependent feeling curve adapted with the scaling factor so that the adaptation feeling curve associates an adapted driver's deceleration demand with the operating variable;
   specifying a target vehicle deceleration depending on a driver operation-dependent driver's deceleration demand determined from the corresponding feeling curve and the assistance deceleration demand if there is an assistance deceleration demand; and
   actuating a brake pressure corresponding to the target vehicle deceleration for adaptively adjusted, driver operation-dependent control of the actual vehicle deceleration.

2. The method as claimed in claim 1, wherein the adapting the mass-dependent feeling curve is only performed if there is an effectively-stationary braking phase in which there is an essentially constant driver's deceleration demand over a period of time of 1 s.

3. The method as claimed in claim 1, wherein a vehicle mass is taken into account when providing the mass-dependent feeling curve,
   wherein the vehicle mass represents the mass of the commercial vehicle or the combined mass of the commercial vehicle and a trailer vehicle.

4. The method as claimed in claim 3, wherein a starting feeling curve is provided as the mass-dependent feeling curve, which represents a previously determined dependency of the driver's deceleration demand on the operating variable that is typical for the vehicle, whereby a vehicle mass is assumed that corresponds to a half-loaded commercial vehicle or a half-loaded combination of the commercial vehicle and the trailer vehicle.

5. The method as claimed in claim 3, wherein the current mass of the commercial vehicle or the current combined mass of the commercial vehicle and the trailer vehicle is determined and once there is a value for the current vehicle mass, a preliminary feeling curve is provided as the mass-dependent feeling curve,
   wherein the preliminary feeling curve results from a previously determined mass feeling curve,
   wherein a first mass feeling curve represents a previously determined dependency of the driver's deceleration demand on the operating variable for a fully loaded commercial vehicle or a fully loaded combination of the commercial vehicle and the trailer vehicle and a second mass feeling curve represents a previously determined dependency of the driver's deceleration demand on the operating variable for an unloaded vehicle or an unloaded combination of the commercial vehicle and the trailer vehicle, and
   the preliminary feeling curve results from the scaling of at least one of the mass feeling curves depending on a deviation of the currently prevailing vehicle mass from the unloaded state or the loaded state of the vehicle or the vehicle combination.

6. The method as claimed in claim 1, wherein a global scaling factor is determined for determining the adaptation feeling curve,
   wherein the global scaling factor is given by a ratio between the actual vehicle deceleration set as a result of the demanded operating variable and the driver's deceleration demand determined from the mass-dependent feeling curve for the operating variable, and
   the entire mass-dependent feeling curve is adapted with said global scaling factor in order to obtain the adaptation feeling curve.

7. The method as claimed in claim 1, wherein local scaling factors are determined for determining the adaptation feeling curve,
   wherein for this purpose the mass-dependent feeling curve is divided into several segments in relation to the operating variable, and once operating variables have been determined from different segments, for each segment a local scaling factor that is only applicable to said segment is determined from a ratio between the actual vehicle deceleration that is set based on the demanded operating variable of the respective segment and the driver's deceleration demand determined from the mass-dependent feeling curve for the operating variable of the respective segment, and
   wherein the mass-dependent feeling curve in the respective segment is adapted with the respective local scaling factor in order to obtain the adaptation feeling curve.

8. The method as claimed in claim 7, wherein in the case in which still no local scaling factor has been determined in a segment, an adaptation of the mass-dependent feeling curve is carried out in said segment with an averaged scaling factor of all previously determined local scaling factors and/or a scaling factor that is valid for the adjacent segment is used in order to obtain the adaptation feeling curve.

9. The method as claimed in claim 7, wherein the segments are of different sizes.

10. The method as claimed in claim 1, wherein if an adaptation feeling curve has already been determined and driver braking is continued, instead of the mass-dependent feeling curve the already determined adaptation feeling curve is further adapted in the adaptation step.

11. The method as claimed in claim 1, wherein in the case in which there is no assistance deceleration demand, during operation of the brake pedal of the brake valve with a force, the operating variable is determined and a brake pressure is set up depending on the force exerted on the wheel brakes of the vehicle to cause a corresponding actual vehicle deceleration.

12. The method as claimed in claim 1, wherein the operating variable is tapped directly at the brake pedal or at a component that is connected to the brake pedal.

13. The method as claimed in claim 1, wherein if the adaptation feeling curve exceeds a previously determined limit feeling curve, the adaptation feeling curve is fixed at the limit feeling curve.

14. The method as claimed in claim 1, wherein if the adaptation feeling curve exceeds a previously determined limit feeling curve, the adaptation feeling curve is determined such that the adaptation feeling curve has a lower gradient than the limit feeling curve at least for operating variables having values below a threshold value and approaches or merges with the limit feeling curve for operating variables having values above a threshold value.

15. The method as claimed in claim 14, wherein the adaptation feeling curve results by scaling the limit feeling curve with a boost factor, whereby the boost factor is greater than 1 for short operating travels and approaches 1 for long operating travels so that the adaptation feeling curve approaches the limit feeling curve.

16. The method as claimed in claim 1, wherein the adaptation step only takes place during a brake application process and/or during a brake releasing process, and
   wherein system-related and design-related hysteresis effects are taken into account during the determination of the adaptation feeling curve.

17. The method as claimed in claim 1, wherein during the adaptation step only the influence of the wheel brakes on the actual vehicle deceleration is taken into account, wherein for this purpose a corrected actual vehicle deceleration is determined that corrects the determined actual vehicle deceleration by an offset deceleration that represents the braking effect without the wheel brakes being operated, and the corrected actual vehicle deceleration forms the basis of the adaptation step instead of the determined actual vehicle deceleration.

18. The method as claimed in claim 17, wherein the offset deceleration depends on a continuously operating brake torque of a continuously operating brake and/or a road upslope and/or a road downslope and/or an engine braking torque and/or rolling resistances of wheels and/or air resistances.

19. The method as claimed in claim 1, wherein the specification of the target vehicle deceleration ($Z_{Soll}$) is at least one of:
   carried out depending on the adaptation feeling curve the adaptation steps have already been carried out once during continuous driver braking and thereby there is an adaptation feeling curve, or
   carried out depending on a preliminary feeling curve once a vehicle mass could be determined and there is still no adaptation feeling curve, or
   carried out depending on a starting feeling curve if neither a vehicle mass could be determined nor is there an adaptation feeling curve.

20. An adaptation unit, configured to perform the method as claimed in claim 1.

21. A commercial vehicle with an adaptation unit as claimed in claim 20 for performing the method as claimed in claim 1.

* * * * *